United States Patent
Brody et al.

[15] 3,672,331
[45] June 27, 1972

[54] DOG TOILET

[72] Inventors: Charles Brody; Rhoda Sharon Brody, both of 18-65 211th Street, Apt. 5C, Bayside, N.Y. 11360

[22] Filed: March 27, 1970

[21] Appl. No.: 14,080

[52] U.S. Cl. ............................................................119/1
[51] Int. Cl. ..................................................A01k 15/00
[58] Field of Search ........................119/1, 23; 4/6, 239, 235

[56] References Cited

UNITED STATES PATENTS

| | | | |
|---|---|---|---|
| 54,480 | 5/1866 | Alexander | 4/235 |
| 388,385 | 8/1888 | Wooster | 119/23 X |
| 1,722,524 | 7/1929 | Immele | 4/239 |
| 2,053,594 | 9/1936 | Albert | 119/1 |
| 2,288,758 | 7/1942 | Trippensee | 4/239 |
| 2,872,686 | 2/1959 | Osborn et al. | 4/6 |

FOREIGN PATENTS OR APPLICATIONS 571,413   3/1959   Canada..................................4/235

*Primary Examiner*—Aldrich F. Medbery
*Attorney*—Alfred W. Barber

[57] ABSTRACT

A platform with legs and a central opening may be placed over a conventional toilet bowl so that a dog or other domestic animal can use the facility without coming in physical contact with the toilet. The central opening comprises a plurality of removable concentric ring shaped inserts for accomodating animals of different sizes.

1 Claim, 5 Drawing Figures

PATENTED JUN 27 1972 3,672,331

DOG TOILET

A great problem and burden for owners of dogs and other domestic pets is that they must be "walked" at places exterior to the owners dwellings for the purpose of having them urinate and defecate. The present invention provides a new and convenient device permitting such pets to use the conventional toilet bowl provided for human use and without coming in physical contact with any part of such toilet. This "dog toilet" comprises a substantially horizontal generally flat seat support member standing on legs which permit easy moving of the device to and from the toilet bowl. The flat seat member includes a plurality of removable concentric ring shaped inserts wherein each insert has an outer and inner inwardly directed tapered parallel edge. Each of these rings or inserts is of a size progressively smaller than its adjacent ring and thus defining a smaller opening. These rings and the support member constitute adjustable openings to accommodate animals of different sizes. This device as generally described above can be made of wood, plastic, fiberboard or other suitable material.

Figure 1:
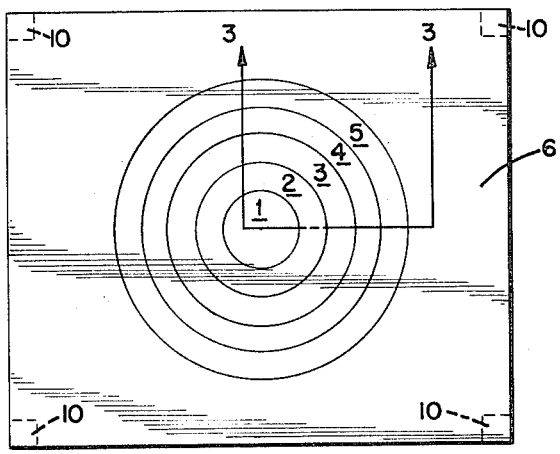
FIG. 1 is a top view of our dog toilet.

FIG. 1 shows the top view of our invention including the generally flat seat support member 6 supported by legs 10 and carrying progressively sized and nesting rings 2, 3, 4 and 5 and center plug 1. It will be seen that if only plug 1 is removed, the smallest opening, for the smallest animal to be accommodated, is exposed. If ring 2 is removed, a larger opening, for a larger animal, is exposed and so on up to ring 5 for the largest opening. Or looking at it the other way around, starting with all rings removed and the largest opening, as first ring 5 is inserted and so on down in number designations, successively smaller openings are provided.

Figure 2:
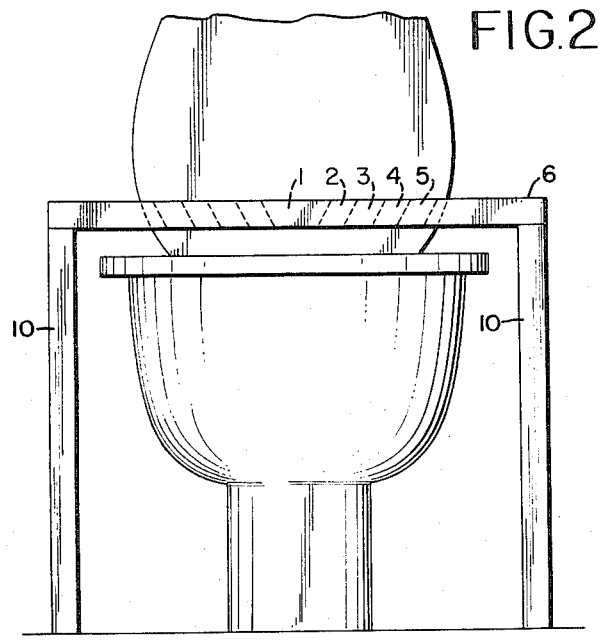
FIG. 2 is a front view of our dog toilet.

FIG. 2 is a front view of our invention in place and in use over a conventional toilet bowl. This shows how platform 6 is supported by legs 10 so that platform 6 is above and not in contact with the lip of the toilet bowl.

Figure 3:
FIG. 3 is a cross-sectional detail of how the concentric size adjusting rings are nested.

FIG. 3 is a corss-section taken along line 3—3 of FIG. 1 and shows how rings 2, 3, 4 and 5 have outer and inner inwardly directed tapered parallel edges so that they nest, do not drop through, and provide a flat upper surface. The inner inwardly tapered edge of the opening in platform 6 is also shown.

Figure 4:
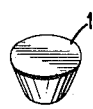
FIG. 4 is a view in perspective of the final insert, a center plug.

FIG. 4 shows the center plug 1 having outer tapered and inwardly directed sides to nest in the smallest ring 2.

Figure 5:
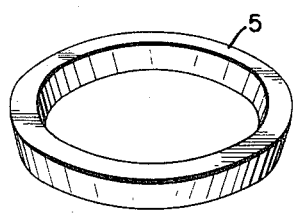
FIG. 5 is a view in perspective of a typical hole size adjusting ring.

FIG. 5 shows the largest ring 5 (the other rings are similar, only different in inner and outer diameters) with its outer and inner inwardly directed tapered parallel edges.

We claim:

1. A portable floor supported animal toilet device for mounting over a conventional bathroom toilet, comprising a substantially horizontal generally flat seat support member,
    said member including a plurality of removable concentric ring shaped inserts each said insert having outer and inner inwardly directed tapered parallel edges,
    each said ring being of a size progressively smaller than said adjacent ring to be received in said adjacent ring to define a flat surface having a smaller opening, said rings and support member constituting a size adjusting means, animal support means when one or more rings are removed or added to accommodate animals of different sizes.

* * * * *